United States Patent [19]

Feasey et al.

[11] 3,950,428

[45] Apr. 13, 1976

[54] AROMATIC POLYMERS

[75] Inventors: Ronald George Feasey, Knebworth; John Brewster Rose, Letchworth, both of England

[73] Assignee: Imperial Chemical Industries Limited, London, England

[22] Filed: Dec. 19, 1974

[21] Appl. No.: 534,590

Related U.S. Application Data

[62] Division of Ser. No. 271,209, July 12, 1972.

[30] Foreign Application Priority Data

July 15, 1971 United Kingdom............... 3312/71

[52] U.S. Cl............................. 260/591; 260/607 A
[51] Int. Cl.$^2$........................... C07C 49/76
[58] Field of Search.................... 260/591, 607 A

[56] References Cited
UNITED STATES PATENTS

| | | | |
|---|---|---|---|
| 3,160,665 | 12/1964 | Siegrist et al. | 260/591 |
| 3,764,583 | 10/1973 | Newton et al. | 260/607 |
| 3,780,000 | 12/1973 | Feasey et al. | 260/591 |

FOREIGN PATENTS OR APPLICATIONS

| | | | |
|---|---|---|---|
| 1,153,035 | 5/1969 | United Kingdom | 260/591 |
| 1,133,561 | 11/1968 | United Kingdom | 260/591 |

*Primary Examiner*—Lewis Gotts
*Assistant Examiner*—D. R. Phillips
*Attorney, Agent, or Firm*—Cushman, Darby & Cushman

[57] ABSTRACT

New aromatic polymers comprising units of the formula

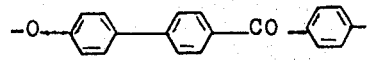

and copolymers comprising such units or other units such as

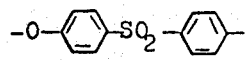 or

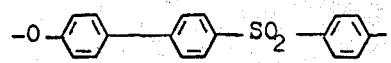

The new polymer may be made from the alkali metal salt of a halophenol of the formula

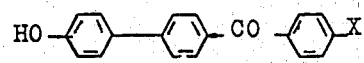

1 Claim, No Drawings

AROMATIC POLYMERS

This is a division of application Ser. No. 271,209 filed July 12, 1972.

This invention relates to new aromatic polymers and to new chemical intermediates from which they may be produced.

According to the present invention there are provided new aromatic polymers whose molecular chains comprise units of the formula

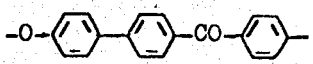

either alone or copolymerised with other units, and in particular with units of the formulae

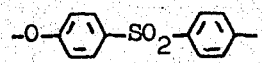

and

According to the invention there are also provided, as new chemical intermediates, halophenols of the formula

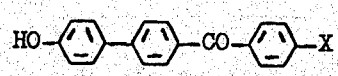

(where X is halogen) and their alkali metal salts.

These halophenols possess a reactive halogen atom as well as a phenolic group and can serve as valuable intermediates for preparing a variety of products; for example the halogen atom can be replaced by amino and substituted amino groups or by oxygen- or sulphur-containing anions to produce amines, ethers and sulphides.

The halophenols of the invention may be made by either of the reaction sequences outlined below, the second being the more convenient.

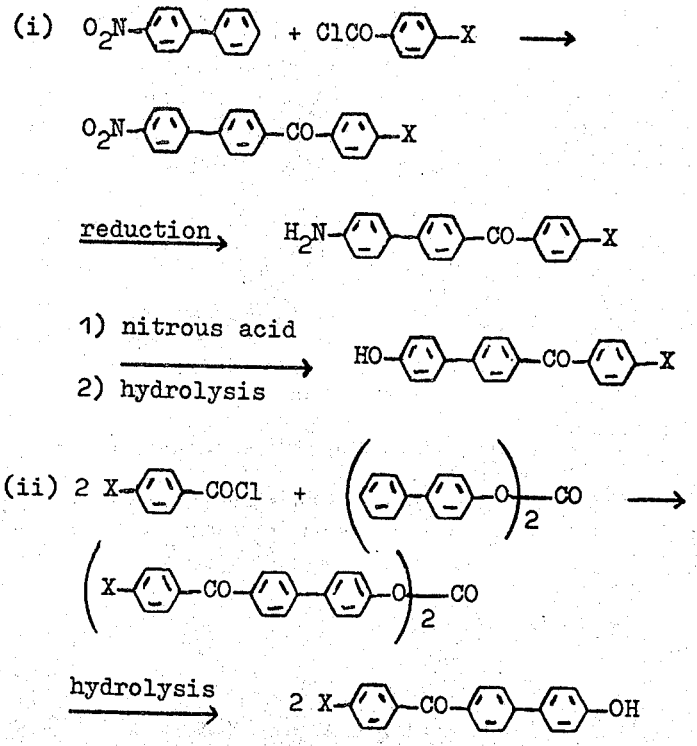

The halophenol can be converted into an alkali metal salt by treatment with a suitable base (e.g. an alkali metal hydroxide or alkoxide). Conveniently hydrolysis of carbonate phenol precursor and subsequent conversion to alkali metal salt of the phenol is carried out in a single step.

The alkali metal salts of the halophenols polymerise at 150°–400°C by displacement of alkali metal halide to give polymers according to the invention having units of the formula

They may be polymerised alone; or they may be copolymerised with alkali metal salts of other activated halophenols (or with mixtures of activated dihalobenzenoid compounds and an equivalent amount of alkali metal hydroxide) and in particular alkali metal salts of halophenols of the formula

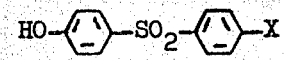

as described in British Specification Nos. 1 153 035, 1 177 183 and 1 234 301; and with the alkali metal salts of halophenols having the formula

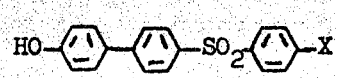

as described in Dutch application Ser. No. 70 11346, or they may be copolymerised with mixtures of alkali metal salts of dihydric phenols and activated dihalobenzenoid compounds as described in British Specification Nos. 1 078 234 and 1 133 561. The halogen atoms in the halophenol or dihalobenzenoid compound are activated by electron-attracting groups such as —SO₂— ortho or para to the halogen atom.

In a further embodiment of the invention, block copolymers may be formed by polymerising an alkali metal salt of a halophenol of the formula

in the presence of preformed polymers comprising benzenoid groups and oxygen or sulphur atoms in the polymer chain, with bivalent electron-attracting groups such as —SO₂— or —CO— also in the polymer chain separated from an oxygen or sulphur atom by a para or ortho phenylene group, such as for example those described in British Specification Nos. 1 078 234 and 1 153 035 and U.S. Pat. No. 3,432,468. Preferred preformed polymers are those having repeating units:

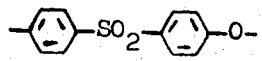

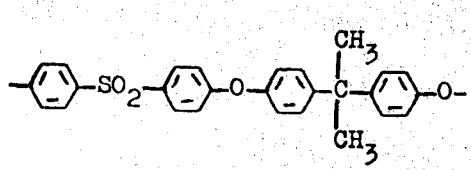

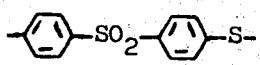

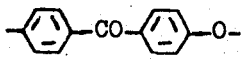

either alone or copolymerised with each other and/or up to 80% of units having the formula

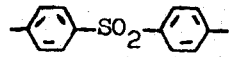

or

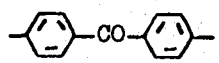

The halogen atoms are preferably chlorine or fluorine. The fluorine derivatives generally are more reactive and enable the displacement of alkali metal halide to be carried out more quickly or at a lower temperature, but are more expensive. Bromine derivatives are also relatively expensive and although they resemble the chlorine derivatives in performance they offer no advantages. Iodine derivatives are generally less suitable.

The alkali metal is conveniently potassium or sodium. Displacement of alkali metal halide often occurs more readily if the potassium cation is present in the reagent used, but the weight (and usually the price) per mole of a potassium compound is higher than for the corresponding sodium compound. Some or all of the alkali metal cation in the reagent may be replaced by an organic onium cation having a positively charged hetero-atom (for example a quaternary ammonium cation such as tetramethyl-ammonium) stable under the conditions of the reaction, and the term "alkali metal salt" as used herein is deemed to refer also to salts containing such onium cations.

The polymerisation is preferably carried out in a polar liquid which is a solvent for alkali metal phenoxides and is stable under the reaction conditions employed, although an alkali metal salt of a 4-(4-halobenzoyl)-4'-hydroxybiphenyl may also be polymerised or copolymerised with another alkali metal salt of a halophenol in the melt.

Suitable polar liquids for the reaction include the lower dialkyl and cyclic alkylene sulphoxides and sulphones (e.g. dimethyl sulphoxide and 1,1-dioxothiolan), aromatic nitriles (e.g. benzonitrile) and diaryl ketones (e.g. benzophenone), sulphoxides and sulphones (e.g. diphenyl sulphone). The total amount of solvent used is desirably sufficient to ensure that none of the starting materials are in the solid state in the reaction mixture.

For example, dimethyl sulphoxide is a convenient solvent but cannot be used at such high temperatures as 1,1-dioxothiolan or diphenyl sulphone.

The liquid reaction medium need not contain any solvent for polymer of high molecular weight even at the later stages of the reaction, although if it does not the product is of relatively low molecular weight unless the final stage of polymerisation is carried out in the melt; this may be explained if the molecular chains of the polymer cease to grow in the solid state.

If the polymerisation reaction is carried out in the presence of a diluent, the reaction mixture may become solid as the polymeric product becomes insoluble. Since this may lead to non-uniform polymerisation reaction, it is desirable to maintain the product in solution by for example raising the temperature as the polymerisation proceeds.

The vessel used should be made of or lined with a material that is inert to alkali metal phenoxides and also to alkali metal halides under the conditions employed. For example, glass is unsuitable as it tends to react with phenoxide anions at high temperatures, upsetting the stoichiometry of the polymerisation and contaminating the product with silicate. Some grades of stainless steel undergo surface crazing at these temperatures in the presence of alkali metal halide, and vessels made of or lined with titanium or nickel or an alloy thereof or some similarly inert material are preferable.

This polymerisation may conveniently be carried out in an extruder or on a heated metal band.

To neutralise any reactive anionic endgroups in the polymer, a reagent therefor may be introduced at the termination of the polymerisation. Reactive monofunctional halides, for example methyl chloride, are particularly suitable.

The alkali metal halide can be removed from the resultant high polymer by any suitable means. For example, it can be extracted from the high polymer using water, or the polymer itself can be dissolved in a strongly polar organic solvent (for example dimethyl formamide, 1-methyl-2-oxo-pyrrolidine, dimethyl sulphoxide, 1,1-dioxothiolan or nitrobenzene) and then reprecipitated by addition to a liquid such as water which is miscible with the polymer solvent but is itself a non-solvent for the polymer.

When the polymer is formed in solution, a convenient procedure is to add the reaction mixture (which may be decanted or filtered from solid alkali metal halide) to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water. An alternative procedure is to add to the reaction mixture an inert solvent such as for example bis(4-chlorophenyl)sulphone, bis(4-methylphenyl)sulphone, diphenyl sulphone which is liquid at the reaction temperature but solid at the temperature at which the polymer is subsequently processed. This procedure enables the reaction solvent to be removed by for example distillation under reduced pressure. The resulting hot polymer solution may then be allowed to cool and solidify and after being pulverised the inert solvent and unwanted reaction products may be extracted by washing with for example water, methanol, acetone.

The new aromatic polymers of the invention may also be made by the polycondensation of a carbonyl chloride of the formula

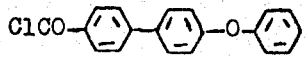

in the presence of a Friedel-Crafts catalyst, and copolymers may be made with sulphonyl or carbonyl chlorides, for example those of the formulae

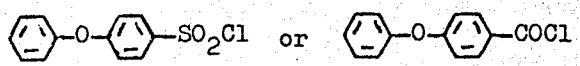

Suitable procedures for such copolymerisations are described in British Specification Nos. 971 227, 1 016 245, 1 060 546, 1 086 021, 1 109 842 and 1 122 192.

The reduced viscosity of the polymer is desirably at least 0.3 (measured at 25°C on a solution of the polymer in a solvent such as dimethyl formamide, N-methyl pyrrolidone or concentrated sulphuric acid containing 1 g of polymer in 100 cm$^3$ of solution i.e. 1% w/v) if it is to serve for structural purposes as a thermoplastic. In general the new thermoplastic polymers of this invention may be used in any of the ways described for similar thermoplastic aromatic polysulphones in British Specification No. 1 016 245. Because many of the polymers may be obtained in crystalline form, they may be of particular value in the form of film and fibre for use at high temperatures.

The following examples illustrate the invention.

The glass to rubber transition temperatures (Tg) and crystalline melting points (Tm) were determined by differential scanning calorimetry with a Perkin Elmer DSC 1B instrument calibrated by standard melting point substances at a heating rate of 16°C/min. The values of Tm were measured on powdered polymers as prepared at the maximum of the endotherm and do not represent the maximum melting point for any particular copolymer which could be attainable after suitable heat treatment. The endotherms were frequently broad especially where the crystallinity is low, as shown by X-ray methods. The values of Tg were measured at the start of the process on all copolymers in the amorphous state. Those that were originally crystalline were first cooled at 64°C/min from above their melting points to obtain them in an amorphous state (unless crystallisation from the melt was too fast).

The Tm and Tg data show the general effect of copolymer composition on the melting and softening characteristics. The melting distribution and Tg values at any copolymer composition can vary with the prior thermal treatment and distribution of comonomer units.

EXAMPLE 1

Bis-[4-(4-chlorobenzoyl)biphenylyl] carbonate (A) and the potassium salt of 4-(4-chlorohenylsulphone) phenol (as 1.3 mole solution in dimethyl sulphoxide) were charged (in amounts shown in Table 1) together with diphenyl sulphone (60 g), dimethyl sulphoxide (100 cm$^3$ as indicated in Table 1) and aqueous potassium hydroxide solution (6.84 g; 0.06 moles) to a three-necked round bottomed flask (capacity 500 cm$^3$) fitted with a stirrer, pocketed thermometer, dry nitrogen inlet, vacuum distillation head, condenser and receiver.

TABLE 1

| Copolymer Composition: Proportion of units (a) and (b) | | Carbonate A | | Potassium salt of 4-hydroxy-4'-chloro-diphenyl sulphone charged* | Volume of dimethyl sulphoxide added |
|---|---|---|---|---|---|
| (a) | (b) | (g) | Moles | Moles | cm$^3$ |
| 0 | 1.00 | — | — | 0.050 | 0 |
| 0.33 | 0.67 | 6.43 | 0.010 | 0.040 | 100 |
| 0.46 | 0.54 | 9.65 | 0.015 | 0.035 | 100 |
| 0.67 | 0.33 | 16.08 | 0.025 | 0.025 | 100 |

TABLE 1-continued

| Copolymer Composition: Proportion of units (a) and (b) | | Carbonate A | | Potassium salt of 4-hydroxy-4'-chloro-diphenyl sulphone charged* | Volume of dimethyl sulphoxide added |
|---|---|---|---|---|---|
| (a) | (b) | (g) | Moles | Moles | cm³ |
| 0.75 | 0.25 | 19.29 | 0.030 | 0.020 | 100 |

*Charged as a 1.3 molar solution in dimethyl sulphoxide.

The reactants were heated to 150°C whilst being stirred under atmospheric pressure and then the pressure was carefully reduced so that water and then dimethyl sulphoxide distilled. When distillation of dimethyl sulphoxide was complete, the temperature of the reaction mixture was raised to 240°C and the pressure returned to atmospheric by the admission of nitrogen into the flask when diphenyl sulphone started to reflux.

After polymerisation for 24 hours, the reaction mixture was cooled, removed from the flask and then mascerated with methanol (ca. 1.5 dm³). The resulting material was extracted with boiling methanol/water mixture (7:2 v/v), boiling water and boiling methanol-/acetone mixture (2:1 v/v) and dried at 120°C under reduced pressure. The polymers consisted of repeat units having the formula

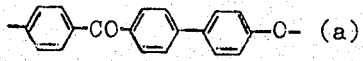   (a)

and

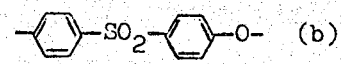   (b)

The polymers obtained by this procedure had the reduced viscosities (measured on 1% w/v solutions at 25°C in (i) dimethyl formamide (ii) N-methyl pyrrolidone and (iii) concentrated sulphuric acid), glass to rubber transition temperatures (Tg), and crystalline melting points (Tm) shown in Table 2. The degree of crystallinity as shown by X-ray methods decreased progressively with increasing proportion of the sulphone component. The nature of the film compression moulded from the polymers is also indicated in Table 2.

TABLE 2

| Copolymer composition: Proportion of units (a) and (b) | | Reduced viscosity | | | Tm (°C) | Compression moulded film |
|---|---|---|---|---|---|---|
| a | b | (i) | (ii) | (iii) | | |
| 0 | 1.00 | 0.55 | — | — | NC | Tough |
| 0.33 | 0.67 | NS | — | 0.42 | 345–373 VB | Brittle |
| 0.46 | 0.54 | NS | — | 0.42 | 365 VB | Brittle |
| 0.67 | 0.33 | NS | NS | 0.30 | 366 | Brittle |
| 0.75 | 0.25 | NS | NS | 0.24 | 370 | Brittle |
| 1.00 | 0 | NS | NS | 0.51 | 418 | Brittle |

NS - not soluble or incompletely soluble
NC - not crystalline
VB - very broad (approximate beginning and end of melting recorded)

EXAMPLE 2

Bis[4-(4-chlorobenzoyl)biphenylyl] carbonate (A) and bis[4-(4-chlorophenylsulphonyl)biphenylyl] carbonate (B) were charged (in amounts given in Table 3) together with dimethyl sulphoxide (125 cm³), diphenyl sulphone (125 g) and aqueous potassium hydroxide solution (22.49 g; 0.20 moles) to a round bottomed flask (capacity 500 cm³) as described in Example 1.

TABLE 3

| Copolymer composition: Proportion of units (a) and (c) | | Carbonate (A) | | Carbonate (B) | | Polymerisation conditions | |
|---|---|---|---|---|---|---|---|
| a | c | g | Moles | g | Moles | Temp. (°C) | Time (hrs) |
| 0 | 1.00 | — | — | 35.75 | 0.0500 | 200 | 18 |
| 0.10 | 0.90 | 3.22 | 0.0050 | 32.16 | 0.0450 | 200 | 19 |
| 0.20 | 0.80 | 6.43 | 0.0100 | 28.60 | 0.0400 | 200 | 18 |
| 0.33 | 0.67 | 10.61 | 0.0165 | 23.95 | 0.0335 | 200 | 18 |
| 0.40 | 0.60 | 12.86 | 0.0200 | 21.45 | 0.0300 | 200 | 17 |
| 0.50 | 0.50 | 16.10 | 0.0250 | 17.90 | 0.0250 | 220–260 | 19 |
| 0.67 | 0.33 | 21.54 | 0.0335 | 11.80 | 0.0165 | 200–260 | 21 |
| 0.80 | 0.20 | 25.72 | 0.0400 | 7.15 | 0.0100 | 240 | 18 |
| 1.00 | 0 | 32.2 | 0.0500 | — | — | 325 | 4 |

The reactants were heated to 150°C whilst being stirred under atmospheric pressure and then the pressure was carefully reduced so that water and then dimethyl sulphoxide distilled. When distillation of dimethyl sulphoxide was complete, the temperature of the reaction mixture was raised to the polymerisation temperature given in Table 3, and the pressure returned to atmospheric by the admission of nitrogen into the flask when the diphenyl sulphone started to reflux.

When the polymerisation was complete, the reaction mixture was cooled, removed from the flask and then mascerated with methanol (ca 1.5 dm³). The resulting material was extracted with boiling methanol-water (7:2 v/v), boiling water and boiling methanol-acetone (2:1 v/v) and dried at 120°C under reduced pressure. The polymers consisted of repeating units having the formulae

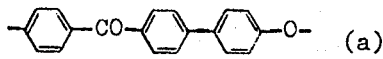 (a)

and

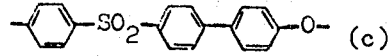 (c)

The polymers obtained by this procedure had the reduced viscosities (measured on 1% w/v solutions at 25°C in (i) dimethyl formamide (ii) N-methyl pyrrolidone and (iii) concentrated sulphuric acid), glass to rubber transition temperatures (Tg), and crystalline melting points (Tm) shown in Table 4. The degree of crystallinity as shown by X-ray methods decreased with increasing proportion of the sulphone component. The nature of the film compression moulded from the polymers is also indicated in Table 4.

TABLE 4

| Copolymer composition: Proportion of units (a) and (c) | | Reduced viscosity | | | Tg (°C) | Tm (°C) | Compression moulded film |
|---|---|---|---|---|---|---|---|
| a | c | (i) | (ii) | (iii) | | | |
| 0 | 1.00 | 1.56 | — | — | 275 | NC | Tough |
| 0.10 | 0.90 | 0.51 | — | — | 268 | NC | Tough |
| 0.20 | 0.80 | 0.57 | 0.88 | 1.13 | 259 | NC | Tough |
| 0.33 | 0.67 | — | 1.01 | 1.45 | 253 | 320–360 VB | Tough |
| 0.40 | 0.60 | NS | 0.77 | 1.10 | 239 | 320–360 VB | Tough |
| 0.50 | 0.50 | NS | NS | 1.26 | 234 | 365 | Tough |
| 0.67 | 0.33 | NS | NS | 0.75 | 220 | 390 | Tough |
| 0.80 | 0.20 | NS | NS | 0.34 | ND | 396 | Brittle |
| 1.00 | 0 | NS | NS | 0.51 | ND | 418 | Brittle |

ND - not detected owing to crystallinity
NS - not soluble or not completely soluble
NC - not crystalline
VB - very broad (approximate beginning and end of melting recorded)

EXAMPLE 3

Bis[4-(4-chlorobenzoyl)biphenylyl]carbonate (A) and bis[4-(4-chlorobenzoyl)phenylyl]carbonate (C) were charged (in amounts given in Table 5) together with dimethyl sulphoxide (125 cm³), diphenyl sulphone (125 g) and aqueous potassium hydroxide solution (22.47 g; 0.20 moles) in a round bottomed flask (capacity 500 cm³) as described in Example 1.

The reactants were heated to 150°C whilst being stirred under atmospheric pressure and then the pressure was carefully reduced so that water and then dimethyl sulphoxide distilled. When distillation of dimethyl sulphoxide was complete, the temperature of the reaction mixture was raised to the polymerisation temperature given in Table 5, and the pressure returned to atmospheric by the admission of nitrogen into the flask when the diphenyl sulphone started to reflux.

When the polymerisation was complete, the reaction mixture was cooled, removed from the flask and then mascerated with methanol (ca 1.5 dm³). The resulting material was extracted with boiling methanol-water (7:2 v/v), boiling water and boiling methanol-acetone (2:1 v/v) and dried at 120°C under reduced pressure. The polymers consisted of repeat units having the formula

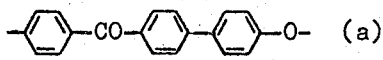 (a)

and

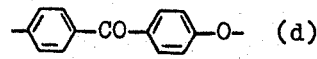 (d)

The polymers obtained by this procedure had the reduced viscosities (measured on 1% w/v solutions at 25°C in concentrated sulphuric acid) shown in Table 5. The polymers were compression moulded into film.

Table 5

| Copolymer composition: Proportion of units (a) and (d) | | Carbonate A | | Carbonate C | | Polymerisation Conditions | | Reduced Viscosity |
|---|---|---|---|---|---|---|---|---|
| a | d | g | Moles | g | Moles | Temp. (°C) | Time (hours) | 1% w/v in c.Sulphuric acid at 25°C. |
| 0 | 1.00 | — | — | 24.55 | 0.0500 | 378 | 1 | 0.50 |
| 0.33 | 0.67 | 10.61 | 0.0165 | 16.45 | 0.0335 | 340 | 3 | 0.48 |
| 0.67 | 0.33 | 21.54 | 0.0335 | 8.10 | 0.0165 | 345 | 2 | 0.53 |
| 1.00 | 0 | 32.2 | 0.0500 | — | — | 325 | 4 | 0.51 |

We claim:
1. A halophenol of the formula

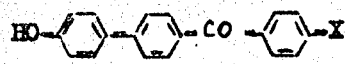

(where X is halogen) or an alkali metal salt thereof.

* * * * *

UNITED STATES PATENT OFFICE
CERTIFICATE OF CORRECTION

Patent No. 3,950,428     Dated April 13, 1976

Inventor(s) Ronald George Feasey and John Brewster Rose

It is certified that error appears in the above-identified patent and that said Letters Patent are hereby corrected as shown below:

In the heading of the patent, the foreign application priority data should read:

--[30]   Foreign Application Priority Data

July 15, 1971    Great Britain .....33312/71 --

Signed and Sealed this

Thirteenth Day of July 1976

[SEAL]

Attest:

RUTH C. MASON
Attesting Officer

C. MARSHALL DANN
Commissioner of Patents and Trademarks